(12) United States Patent
Nakayama

(10) Patent No.: US 6,250,317 B1
(45) Date of Patent: Jun. 26, 2001

(54) METHOD OF REMOVAL OF APPLIED FILM

(75) Inventor: Yasuharu Nakayama, Kanagawa (JP)

(73) Assignee: Kansai Paint Co. Ltd, Amagasaki (JP)

( * ) Notice: Subject to any disclaimer, the term of this patent is extended or adjusted under 35 U.S.C. 154(b) by 0 days.

(21) Appl. No.: 09/022,542

(22) Filed: Feb. 12, 1998

(30) Foreign Application Priority Data

Feb. 12, 1997 (JP) .................................................. 9-063692

(51) Int. Cl.⁷ .............................. B08B 7/00; C09D 9/00
(52) U.S. Cl. ............................................. 134/38; 510/201
(58) Field of Search ................. 134/38; 510/201

(56) References Cited

U.S. PATENT DOCUMENTS

| | | | |
|---|---|---|---|
| 4,210,565 | * 7/1980 | Emmons . | |
| 4,952,623 | * 8/1990 | Auchter et al. | 524/517 |
| 4,988,762 | * 1/1991 | Overbeek et al. | 524/839 |
| 5,147,926 | * 9/1992 | Meichsner et al. | 524/591 |
| 5,208,282 | * 5/1993 | Rehmer et al. | 524/190 |
| 5,571,862 | * 11/1996 | Santini et al. | 524/801 |
| 5,596,035 | * 1/1997 | Desor et al. | 524/460 |
| 5,623,016 | * 4/1997 | Klein et al. | 524/591 |
| 5,747,572 | * 5/1998 | Kashiwada et al. | 524/265 |

FOREIGN PATENT DOCUMENTS

| | | | |
|---|---|---|---|
| 708141 | * 4/1965 | (CA) | 134/38 |
| 89-027853/04 | * 2/1987 | (JP) | 134/38 |
| 89-34085847 | * 6/1988 | (JP) | 134/38 |
| 90-228556/30 | * 9/1988 | (JP) | 134/38 |

OTHER PUBLICATIONS

Zabicky, "The Chemistry of Amides" Part Two *Interscience Publishers* pp. 515–600 (1970).

\* cited by examiner

*Primary Examiner*—Randy Gulakowski
*Assistant Examiner*—Yolanda E. Wilkins
(74) *Attorney, Agent, or Firm*—Rader, Fishman & Grauer

(57) ABSTRACT

Method for the removal of an applied film having a resin containing a unit represented by the following formula (1)

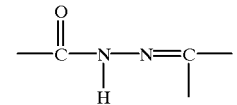

as a component thereof, the method including contacting the applied film with a mixture (A) comprising (a) an acidic compound and (b) water.

14 Claims, No Drawings

METHOD OF REMOVAL OF APPLIED FILM

BACKGROUND OF THE INVENTION

1. Field of the Invention

This invention relates to films and methods for the removal of applied films.

2. Description of Related Art

At present, the development of coating materials that cause little or no environmental pollution and promise to conserve energy has been advancing to a large extent. In recent years, a great need has arisen for suitable methods for recovering and putting to reuse (recycling) articles that are coated with an applied film. When these coated articles are to be actually recovered and reused, however, difficulty is often encountered in removing the applied films from the coated articles, thus posing a serious obstacle. Particularly, substances such as plastics tend to aggravate the difficulty incurred in recovering and reusing the coated articles because they generally cannot be heated. However, in the case of an applied film which is intended to provide temporary protection for a coated article during fabrication, it is often preferable that the applied film be capable of being removed from the coated article with simplicity.

The resin for forming an applied film is generally a macromolecular substance which is capable of enabling the applied film to manifest superior and/or perfect film properties. Often, the applied film is in a cross-linked state. It is extremely difficult to remove this applied film simply using an organic solvent. This fact constitutes a serious hindrance to recovering and reusing the coated article. For the applied film to be easily removed, it might be thought that it would suffice to incorporate an easily severable bond into the applied film. However, a bond which is easily separable may possess inferior weatherability and, therefore, often proves to be unfit for a binder of a coating material.

SUMMARY OF THE INVENTION

The present inventor has pursued a diligent study with a view to solving the various defects suffered by the prior art as described above. As a result, the inventor found an applied film formed of a resin comprising a compound or unit represented by the following formula

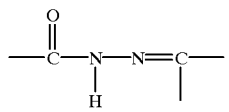

excels in waterproofness and lightfastness, and also decomposes upon contact with an acid and water.

The present invention is therefore directed to films and methods for the removal of a film applied to an article, the film being formed of a resin containing a unit represented by the following formula

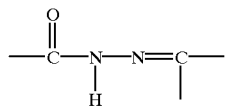

The method comprising contacting the film with a mixture (A) comprising (a) an acidic compound and (b) water.

Additional objects, features and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

DETAILED DESCRIPTION OF A PREFERRED EMBODIMENT

The present invention also includes the use of mixtures (A) that contain (c) an organic solvent. The resin containing a chemical structure represented by the chemical structural formula (1) can be produced, for example, by a reaction of a carbonyl group-containing compound with a hydrazide group-containing compound. In addition, the applied film may optionally be a cross-linked applied film.

The applied film to be used in the method of this invention is subject to no particular restriction except for the requirement that the resin forming the applied film contain a chemical structure or compound represented by the chemical structure formula (1) mentioned above. Concrete examples of the applied film include an applied film which is formed by cross-linking a carbonyl group-containing resin with a polyhydrazide compound or a polysemicarbazide compound and an applied film which is formed by cross-linking a polyhydrazide-containing resin or a polysemicarbazide-containing resin with a carbonyl group-containing compound which have been reported in numerous articles of literature [for example, The Chemistry of Amides, Part Two, published by Interscience Publishers in 1970, Chapter 10, pp. 515–600 which is incorporated herein by reference].

The acidic compound (a) to be used in the mixture (A) by the method of this invention is generally intended as a catalyst for a hydrolytic reaction of a compound of formula (1) mentioned above. The acidic compound (a) is not subject to any particular restriction and, for effective use herein, may be, for example, either an inorganic acid or an organic acid. It should, however, preferably be an organic acid that would be readily soluble in the mixture (A), depending on the composition of (A). The power with which the acidic compound decomposes the applied film increases in proportion as the compound gains in acidity. As concrete examples of the acidic compound (a), monobasic acids, dibasic acid, polybasic acid, and inorganic acids may be cited.

Suitable monobasic acids include aromatic monobasic acids such as toluene sulfonic acid, benzoic acid, methylbenzoic acid, and p-t-butylbenzoic acid; saturated or unsaturated fatty acids of 1–24 carbon atoms such as formic acid, acetic acid, lactic acid, propionic acid, butyric acid, caproic acid, caprylic acid, peralgonic acid, capric acid, undecanoic acid, lauric acid, myristic acid, palmitic acid, stearic acid, cyclohexane carboxylic acid, 9-decenoic acid, oleic acid, eleostearic acid, eraidic acid, brassylic acid, linolic acid, and linoleic acid; and hydroxyl carboxylic acids (oxy acids) such as dimethyl propionic acid, oxypivalic acid, 12-hydroxydodecanoic acid, 12-hydroxystearic acid, ricinolic acid, paraoxybenzoic acid, salicylic acid, and 4,4-bis (4'-hydroxyphenyl) pentanoic acid, for example. Lower alkyl esters and glycerides of these monobasic acids and such cyclic ester compounds as ε-caprolactone, γ-valerolactone, and other lactones are also usable as monobasic acids.

Concrete examples of the dibasic acid include aromatic dicarboxylic acids and anhydrides thereof such as terephthalic acid, isophthalic acid, phthalic acid, naphthalene dicarboxylic acid, 4,4'-biphenyl dicarboxylic acid, and diphenyl methane-4,4'-dicarboxylic acid; alicyclic dicarboxylic acids and anhydrides thereof such as hexahydroisophthalic acid, hexahydroterephthalic acid, hexahydrophthalic acid, and tetrahydrophthalic acid; aliphatic dicarboxylic acids and anhydrides thereof such as adipic acid, sebacic acid, suberic acid, succinic acid, glutaric acid, maleic acid, chloromaleic acid, fumaric acid, dodecanoic diacid, pimelic acid, azelaic acid, itaconic acid, citraconic acid, and dimeric acid; and lower alkyl esters such as methyl esters and ethyl esters of these dicarboxylic acids.

Concrete examples of the polybasic acid include aromatic polybasic acids and anhydrides thereof such as phthalic acid, isophthalic acid, terephthalic acid, 4,4'-biphenyl dicarboxylic acid, 2,6-naphthalene dicarboxylic acid, tetrachlorophthalic acid, 4,4'-diphenyl methane dicarboxylic acid, trimellitic acid, trimesic acid, and pyromellitic acid; saturated and unsaturated polybasic acids and anhydrides thereof such as succinic acid, glutaric acid, adipic acid, azelaic acid, sebacic acid, dodecane dicarboxylic acid, suberic acid, pimelic acid, maleic acid, fumaric acid, itaconic acid, brassylic acid, and citraconic acid; alicyclic polybasic acids and anhydrides thereof such as hexahydrophthalic acid, hexahydroisophthalic acid, hexahydroterephthalic acid, hexahydrotrimellitic acid, methyl hexahydro-phthalic acid, methyl hydroterephthalic acid, $\Delta$1-tetrahydrophthalic acid, $\Delta$2-tetrahydrophthalic acid, $\Delta$3-tetrahydrophthalic acid, $\Delta$4-tetrahydrophthalic acid, $\Delta$1-tetrahydroisophthalic acid, $\Delta$2-tetrahydroisophthalic acid, $\Delta$3-tetrahydroisophthalic acid, $\Delta$4-tetrahydroisophthalic acid, $\Delta$1-tetrahydroterephthalic acid, $\Delta$2-tetrahydroterephthalic acid, methyl tetrahydrophthalic acid, endomethylene tetrahydrophthalic acid, and methylendomethylene tetrahydrophthalic acid; hexachloroendomethylenetetrahydrophthalic acid; and anhydrides of the polybasic acids mentioned above and ester-forming reactive derivatives thereof such as lower alkyl esters (particularly dimethyl esters) of 1–6 carbon atoms.

As concrete examples of the inorganic acid, hydrochloric acid, sulfuric acid, phosphoric acid, phosphorous acid, nitric acid, and anhydrides thereof, and esterification products of these acids may be cited.

The acidic compounds cited above may be used either singly or in the form of a mixture of two or more members.

Among other acidic compounds enumerated above, organic acids of low molecular weights such as formic acid, acetic acid, lactic acid, itaconic acid, maleic acid, and benzoic acid and anhydrides thereof; and inorganic acids such as hydrochloric acid, sulfuric acid, phosphoric acid, and nitric acid and anhydrides thereof prove to be particularly advantageous.

The amount of the acidic compound (a) to be used is generally in the range of 0.01–99.99% by weight, preferably 0.1–95% by weight, and more preferably 0.5–70% by weight, based on the weight of the mixture (A). If the amount of the acidic compound (a) is less than about 0.01% by weight, the desired decomposition may proceed at an unduly low speed. Conversely, if this amount exceeds about 99.99% by weight, the excess may possibly pose disadvantages by decreasing the content of the other essential components and lowering the speed of the decomposition of the applied film.

The amount of the water (b) to be used in the mixture (A) by the method of this invention is generally in the range of 0.01–99.99% by weight, preferably 0.5–60% by weight, and more preferably 1–40% by weight, based on the weight of the mixture (A). If the amount of the water (b) to be used is less than about 0.01% by weight, the applied film may not be decomposed. Conversely, if this amount exceeds about 99.99% by weight, the decomposed applied film may possibly fail to dissolve in the mixture (A). Thus, both deviations from the specified range prove to be somewhat disadvantageous.

Further in the method of this invention, the mixture (A) may incorporate therein an ordinary organic solvent (c) for purposes of promoting the solution of the applied film into the mixture (A) or for purposes of promoting the solution of the acidic compound (a) and the water (b) in the mixture (A). Though the amount of the organic solvent (c) to be incorporated is not subject to any particular restriction, it is generally not more than 99.8%, preferably not more than 99.0% by weight, based on the weight of the mixture (A). The ordinary solvents mentioned above may be used either singly or in the form of a mixture of two or more members.

Any desired organic solvent can be used. Suitable organic solvents (c) include hydrocarbon type solvents such as pentane, hexane, heptane, octane, isooctane, nonane, decane, dodecane, cyclopentane, methyl cyclopentane, cyclohexane, methyl cyclohexane, pentene, hexene, octene, decene, benzene, toluene, xylene, ethyl benzene, cumene, mesitylene, butyl benzene, diethyl benzene, cyclohexene, petroleum ether, petroleum benzine, kerosene, and turpentine oil; halogenated hydrocarbon type solvents such as dichloromethane, chloroform, carbon tetrachloride, ethyl chloride, dichloroethane, trichloroethane, tetrachloroethane, hexachloroethane, trichloroethylene, propyl chloride, dichloropropane, butyl chloride, chlorobenzene, dichlorobenzene, trichlorpobenzene, chlorotoluene, and trichlorotrifluoroethane; alcohol type solvents such as methanol, ethanol, propanol, butanol, pentanol, pentyl alcohol, hexanol, heptanol, octanol, allyl alcohol, benzyl alcohol, cyclohexanol, methyl cyclohexanol, fusel oil, ethane diol, propane diol, butane diol, and glycerine; ether type solvents such as dipropyl ether, dibutyl ether, dihexyl ether, ethylvinyl ether, butylvinyl ether, anisole, propylene oxide, epoxy butane, dioxane, tetrahydrofuran, tetrahydropyrane, dimethoxy ethane, 1,2-dibutoxy ethane, diethylene glycol dimethyl ether, diethylene glycol diethylene ether, acetal, ethylene glycol monomethyl ether, propylene glycol monomethyl ether, propylene glycol monoethyl ether, propylene glycol monopropyl ether, ethylene glycol monobutyl ether, propylene glycol monobutyl ether, 3-methyl-3-methoxy propane, diethylene glycol, and triethylene glycol; ketone type solvents such as acetone, methylethyl ketone, pentanone, hexanone, methylisobutyl ketone, heptanone, acetonyl acetone, dioxobutyl ketone, isophorone, cyclohexanone, methyl cyclohexanone, and acetophenone; ester type solvents such as methyl formate, ethyl formate, propyl formate, butyl formate, methyl acetate, ethyl acetate, propyl acetate, butyl acetate, pentyl acetate, 3-methoxybutyl acetate, cyclohexyl acetate, methyl propionate, benzyl acetate, butyl propionate, butyric esters, diethyl malonate, ethylene glycol monoacetate, ethylene glycol esters, diethylene glycol monoacetate, diethyl carbonate, ethylene carbonate, boric esters, and phosphoric esters; nitrogen compound type solvents such as nitromethane, nitropropane, nitrobenzene, acetonitrile, triethyl amine, diethyl amine, butyl amine, aniline, N,N-dimethyl aniline, pyridine, N-methyl formamide, N,N-dimethyl formamide, acetamide, N,N-dimethyl-acetamide, 2-pyrrolidone, N-methyl pyrrolidone, $\epsilon$-caprolactam, and morpholine; and sulfur type solvents such as carbon disulfide, dimethyl sulfoxide, and sulforan, for example.

Among other organic solvents mentioned above, hydrocarbon solvents, alcohol solvents, ether solvents, and ether solvents which are capable of thoroughly solving ordinary coating materials and applied films prove to be advantageous. Organic solvents having boiling points in the range of 20–250° C., preferably 40–200° C., are preferred on account of ease of use.

Though the method for establishing contact between the mixture (A) and the applied film by the method of this invention is not subject to any particular restriction, the contact may be attained, for example, by immersing the applied film in the mixture (A) or by exposing the applied film to the mixture (A) in the gaseous phase. Though the contact temperature is not subject to any particular restriction, it is generally in the range of room temperature–200° C. One of skill in the art can determine the suitable contact time; however in a preferred embodiment, the film is contacted with the mixture for a period ranging from 5–40 minutes, more preferably, from 5–20 minutes.

The coated article imposes no restriction particularly but requires only to be insoluble in the mixture (A) mentioned above. Even when the applied film contains a pigment or such an additive as is generally used as a component for a coating material, the method of this invention generally incurs no hindrance of any sort.

This invention will be described more specifically below with reference to working examples, which are illustrative only and should not be construed as limiting the invention.

Production Example 1

In a flask, 50 parts by weight of propylene glycol monomethyl ether was placed and heated to 100° C. Then, a mixture of the following components was added dropwise to the hot ether over a period of 1.5 hours.

| | |
|---|---|
| Acrylic acid | 6 parts by weight |
| Diacetone acrylamide | 180 parts by weight |
| Styrene | 65 parts by weight |
| Stearyl methacrylate | 135 parts by weight |
| n-Butyl acrylate | 64 parts by weight |
| Azobis-isobutylonitrile | 3 parts by weight |
| Propylene glycol monomethyl ether | 50 parts by weight |

The reaction mixture obtained after completion of the dropwise addition was left aging for one hour. Then, 2 parts by weight of a polymerization initiator (produced by Nippon Oils & Fats Co., Ltd. and marketed under trademark designation of "Perbutyl O") was added to the aged reaction mixture in five split portions over a period of one hour. The resultant mixture was further left aging at 110° C. for two hours and then cooled. The cooled mixture and 225 parts by weight of isopropyl alcohol and 7 parts by weight of triethyl amine added thereto were stirred and emulsified by simultaneous addition of deionized water. Thereafter, the resultant emulsion was exposed to a reduced pressure to expel the solvent and obtain an emulsion having a solids content of 43% by weight.

Example 2

In a flask, 90 parts by weight of butyl cellosolve was placed and heated to 100° C. Then, a mixture of the following components was added dropwise to the hot ether over a period of 1.5 hours.

| | |
|---|---|
| Dimethyl aminoethyl methacrylate | 54 parts by weight |
| Diacetone acrylamide | 135 parts by weight |
| Styrene | 90 parts by weight |
| Stearyl methacrylate | 120 parts by weight |
| n-Ethylhexyl methacrylate | 45 parts by weight |
| Butyl cellosolve | 50 parts by weight |
| Azobis-isobutylonitrile | 1.5 parts by weight |

The reaction mixture obtained after completion of the dropwise addition was left aging for one hour. Then, 2 parts by weight of a polymerization initiator (produced by Nippon Oils & Fats Co., Ltd. and marketed under trademark designation of "Perbutyl O") was added to the aged reaction mixture in five split portions over a period of one hour. The resultant mixture was further left aging at 110° C. for two hours and then cooled. The cooled mixture and 130 parts by weight of butyl cellosolve, 45 parts by weight of benzyl alcohol, and 8.5 parts by weight of acetic acid added thereto were stirred and subsequently dispersed in deionized water to obtain an electrodeposition coating material.

Example 1 of Applied Film Production

A solution of 1.4 parts by weight of carbohydrizide in 5 parts by weight of deionized water was added to 100 parts by weight of the emulsion obtained in Production Example 1. The resultant mixture was immediately applied to a tin plate with a bar coater, No. 60. The applied film was dried at room temperature for three days and then dried at 80° C. for 10 minutes to obtain an applied film (X) as a sample subjected to a test for removal.

Example 2 of Applied Film Production

A solution produced by dissolving 16 parts by weight of 1,3- bis(hydrazinocarboethyl)5-isopropyl hydantoin (produced by Ajinomoto Co., Inc. and marketed under trademark "Amicure VDH") in 20 parts by weight of deionized water was added to 100 parts by weight of the emulsion obtained in Production Example 1. The mixture was processed by following the procedure of Example 1 of applied film production to obtain an applied film (Y) as a sample subjected to a test for removal.

Example 3 of Applied Film Production

A non-cross-linked applied film, 40 μm in thickness, was obtained by cationically electrodepositing the electrodeposition coating material obtained in Production Example 2 on a plate treated with zinc phosphate. In an immersion cross-linking solution consisting of 160 parts by weight of deionized water, 20 parts by weight of carbohydrazide, 10 parts by weight of phosphoric acid, 20 parts by weight of propylene glycol monopropyl ether, and 20 parts by weight of propylene glycol monomethyl ether, the applied film was kept immersed at 20° C. for 20 minutes. Thereafter, it was washed with water and dried at 80° C. for 10 minutes to obtain an applied film (Z) as a sample subjected to a test for removal.

EXAMPLES 1–17

Comparative Examples 1–8

The applied films obtained in Examples 1–3 of applied film production were immersed in the mixtures shown in Table 1–3 below for prescribed durations at prescribed temperatures and then were visually examined for state of film. The results are shown in the tables.

The method of this invention manifests a prominent effect of allowing easy removal of an applied film attached to a coated article.

Other embodiments of the invention will be apparent to those skilled in the art from consideration of the specification and practice of the invention disclosed herein. It is intended that the specification be considered as exemplary only, with the true scope and spirit of the invention being indicated by the following claims.

The Priority Document, Japanese Patent Application No. 9-63692 filed Feb. 12, 1997, as well as all documents referred to herein are expressly incorporated by reference.

As used herein and in the following claims, singular articles such as "a", "an", and "one" are intended to refer to singular or plural.

TABLE 1

| | Examples | | | | | | | | | |
|---|---|---|---|---|---|---|---|---|---|---|
| | 1 | 2 | 3 | 4 | 5 | 6 | 7 | 8 | 9 | 10 |
| Kind of applied film used for test | X | X | X | X | X | Y | Z | Z | X | X |
| Composition of mixture A (parts by weight) | | | | | | | | | | |
| (a) Acidic compound | | | | | | | | | | |
| 100% Acetic acid | 10 | 2 | 10 | | | 10 | 20 | 10 | 10 | 10 |
| 90% Formic acid | | | | 5 | | | | | | |
| 1/10-N Hydrochloric acid | | | | | 5 | | | | | |
| (b) Water | | | | | | | | | | |
| Tap water | 2 | 2 | 2 | 2 | | 2 | 2 | 2 | 2 | 2 |
| (c) Organic solvent | | | | | | | | | | |
| Cyclohexanone | 10 | 18 | | 15 | 20 | 10 | | 10 | | |
| Methyl isobutyl ketone | | | 10 | | | | | | | |
| Propylene glycol monopropyl ether | | | | | | | | | 10 | |
| Butyl acetate | | | | | | | | | | 10 |
| Benzyl alcohol | | | | | | | | | | |
| Toluene | | | | | | | | | | |
| Acetone | | | | | | | | | | |
| Immersion temperature (° C.) | 90 | 90 | 90 | 20 | 90 | 90 | 80 | 80 | 80 | 80 |
| Immersion time | 10 minutes | 20 minutes | 10 minutes | 10 minutes | 10 minutes | 5 minutes | 10 minutes | 10 minutes | 10 minutes | 10 minutes |
| State of applied film | Dissolved | Dissolved | Dissolved | Dissolved | Dissolved | Dissolved | Dissolved | Dissolved | Dissolved | Dissolved |

TABLE 2

| | Examples | | | | | | |
|---|---|---|---|---|---|---|---|
| | 11 | 12 | 13 | 14 | 15 | 16 | 17 |
| Kind of applied film used for test | X | X | X | X | X | X | X |
| Composition of mixture A (parts by weight) | | | | | | | |
| (a) Acidic compound | | | | | | | |
| 100% Acetic acid | 10 | | | | | 10 | 10 |
| 90% Formic acid | | 5 | 5 | 5 | 5 | | |
| 1/10-N Hydrochloric acid | | | | | | | |
| (b) Water | | | | | | | |
| Tap water | 2 | 2 | 2 | 2 | 2 | 2 | 2 |
| (c) Organic solvent | | | | | | | |
| Cyclohexanone | | | | | | | |
| Methyl isobutyl ketone | | | | | | | |
| Propylene glycol monopropyl ether | | | | | | | 10 |
| Butyl acetate | | | 15 | 15 | 15 | | |
| Benzyl alcohol | | 10 | | | | | |
| Toluene | | | | | | 10 | |
| Acetone | | | | | | | 15 |

TABLE 2-continued

| | Examples | | | | | | |
|---|---|---|---|---|---|---|---|
| | 11 | 12 | 13 | 14 | 15 | 16 | 17 |
| Immersion temperature (° C.) | 80 | 20 | 50 | 70 | 80 | 20 | 80 |
| Immersion time | 10 minutes | 40 minutes | 15 minutes | 7 minutes | 8 minutes | 40 minutes | 15 minutes |
| State of applied film | Dissolved | Dissolved | Dissolved | Dissolved | Dissolved | Dissolved | Dissolved |

TABLE 3

| | Comparative Examples | | | | | | | |
|---|---|---|---|---|---|---|---|---|
| | 1 | 2 | 3 | 4 | 5 | 6 | 7 | 8 |
| Kind of applied film used for test | X | X | Y | Y | Z | Z | X | X |
| Composition of mixture A (parts by weight) | | | | | | | | |
| (a) Acidic compound | | | | | | | | |
| 100% Acetic acid | 10 | | 10 | | 20 | 10 | 10 | 10 |
| 90% Formic acid | | | | | | | | |
| 1/10-N Hydrochloric acid | | | | | | | | |
| (b) Water | | | | | | | | |
| Tap water | | 2 | | 2 | | | | |
| (c) Organic solvent | | | | | | | | |
| Cyclohexanone | 10 | 10 | 10 | 10 | | 10 | | |
| Methyl isobutyl ketone | | | | | | | | |
| Propylene glycol monopropyl ether | | | | | | | | |
| Butyl acetate | | | | | | | | 10 |
| Benzyl alcohol | | | | | | | | |
| Toluene | | | | | | | 10 | |
| Acetone | | | | | | | | |
| Immersion temperature (° C.) | 90 | 90 | 90 | 90 | 80 | 80 | 80 | 80 |
| Immersion time | 10 minutes | 10 minutes | 10 minutes | 10 minutes | 2 hours | 2 hours | 1 hour | 3 hours |
| State of applied film | Peeled, Colored | Peeled | Peeled | Peeled | film remained | film remained | film remained | film remained |

What is claimed is:

1. A method for the removal of a film applied to an article, which comprises the step of dissolving said film in a mixture (A) comprising (a) an acidic compound and (b) water, said film comprising a resin formed of a unit represented by the following formula

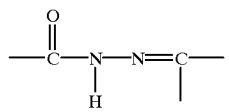

2. A method according to claim 1, wherein said mixture (A) further comprises (c) an organic solvent.

3. A method according to claim 1, wherein said resin is produced by a reaction of a carbonyl group-containing compound with a hydrazide group-containing compound.

4. A method according to claim 1, wherein said film is cross-linked.

5. A method according to claim 2, wherein said organic solvent has a boiling point in the range of 20–250° C.

6. A method according to claim 2, wherein said organic solvent has a boiling point in the range of 40–200° C.

7. A method according to claim 1, wherein said acidic compound is selected from the group consisting of acetic acid, hydrochloric acid, and formic acid.

8. A method according to claim 1, wherein said contacting step is conducted by immersing the film in the mixture (A) or by exposing the film to the mixture (A) in the gaseous phase.

9. A method according to claim 1, wherein said contacting step is conducted at a temperature ranging from room temperature to 200° C.

10. A method according to claim 2, wherein said organic solvent is selected from the group consisting of hydrocarbons, alcohols, and ethers.

11. A method according to claim 2, wherein said organic solvent is selected from the group consisting of cyclohexanone, methyl isobutyl ketone, propylene glycol monopropyl ether, butyl acetate, benzyl alcohol, toluene and acetone.

12. A method according to claim 1, wherein said water is present in an amount ranging from 1 to 40% by weight based on the total weight of the mixture (A).

13. A method according to claim 1, wherein said acidic compound is an inorganic acid or an organic acid.

14. A method according to claim 13, wherein said organic acid is selected from the group consisting of a monobasic acid, a dibasic acid, and a polybasic acid.

* * * * *